United States Patent [19]

Ripani

[11] 4,142,847
[45] Mar. 6, 1979

[54] MOLD FILLING APPARATUS WITH PRODUCT FEED CONTROL

[75] Inventor: Sergio Ripani, Milan, Italy

[73] Assignee: Carle & Montanari S.p.A., Milan, Italy

[21] Appl. No.: 786,662

[22] Filed: Apr. 11, 1977

[51] Int. Cl.² .................... A23G 1/20; G01G 13/24
[52] U.S. Cl. ........................... 425/140; 177/80; 425/148
[58] Field of Search .............. 425/148, 140, 135, 145; 141/83; 177/60, 80, 50, 52, 87, 89, 81, 121; 222/55; 164/155; 156/360

[56] References Cited
U.S. PATENT DOCUMENTS

| 3,011,572 | 12/1961 | Bellier | 177/80 |
| 3,179,069 | 4/1965 | Bartholomew | 425/140 X |
| 3,484,813 | 12/1969 | Davies | 177/50 |
| 4,038,531 | 7/1977 | Loe | 425/148 X |

Primary Examiner—William R. Briggs
Attorney, Agent, or Firm—Ralph W. Kalish

[57] ABSTRACT

A device for controlling and regulating the amount of product to be poured into the moulds of forming machines for chocolate and similar products, in which the conveyor belt carrying the filled moulds is fitted with a balance for weighing each single filled mould and for comparing the effective weight of the filled mould with a preset rated weight, the said balance being connected with a regulation mechanism for increasing or decreasing the quantity of chocolate or similar to be poured.

2 Claims, 2 Drawing Figures

MOLD FILLING APPARATUS WITH PRODUCT FEED CONTROL

BACKGROUND OF THE INVENTION

The present invention relates to a device for controlling and regulating the amount of product which is poured into the moulds of chocolate or similar forming machines.

For the making of confectionary items machines are used (see German Pat. No. 972,397) which pour the product to be formed in suitable pits in the moulds moving on a conveyor belt passing below the pouring head of the forming machine.

It is well known that, legally, confectionery items, for example chocolate bars, must clearly indicate on the wrapping the composition of the product and its weight which shall never be lower than that which is quoted. For this reason, the forming machines of this kind are regulated to pour always a slightly higher amount of product into the pits, so that the final weight will be superior by some grams to the weight indicated on the wrapping, for example of a chocolate bar.

The forming machines therefore are provided with regulation means which are manually operated by the operator of the machine who, from time to time, removes, stopping the whole installation, one of the moulds already filled for controlling the weight, then reinserting the mould and, after regulating the quantity poured as required, restarting the machine. This to ensure the pouring of a higher or lower quantity of product into the moulds and to make sure that the final weight of each mould will be slightly in excess of that indicated on the wrapping.

This manual control does not only require labour and interruptions of the manufacturing process, but, because of the intermittent controls made, the excess weight to be poured into the moulds (required to avoid the dropping below the weight value given on the finished product) cannot be maintained within sufficiently narrow limits and the tolerances used are rather large.

When considering that the overweight may be about 10 to 20 grams for each mould and allowing for about 30 moulds a minute, there will be considerable differences at the end of a working day between the product poured and that declared.

SUMMARY OF THE INVENTION

It is the object of this invention to overcome the drawbacks characterising the preceding state of the art and to propose means to allow a continuous high-precision control and regulation of the weight of product poured into the moulds.

This object is reached according to this invention by providing the conveyor belt carrying the filled moulds with a balance for weighing each single mould when filled, the said balance having a device for comparing the effective weight of the filled mould with a given standard weight and with the said device of comparison being connected to a regulation mechanism for increasing or decreasing as required the amount of poured product.

The above described system allows the continuous and automatic control and regulation of the weight of product to be poured into the moulds without having to interrupt the pouring and conveying phase and without the need of labour. In addition, the tolerances required to reach the required overweight and for avoiding to drop below the weight declared are much narrower with a considerable saving in the material used, be it chocolate, creams or the like. The moulds nowadays normally used are in particular made of synthetic materials with substantial differences in weight, thus influencing the final result in a rather negative manner while, as already mentioned, it is indispensable that the amount of product poured remains within certain limits to ensure that the final product has always a given weight. It is therefore a further object of this invention to improve still further the proposed system by allowing it to keep account, in the pouring phase, not only of the weight of the poured product, but also of the weight of each single empty mould. Before arriving at the batching machine a balance is preferentially provided for weighing each single mould, the said balance having means for transmitting the weight of each empty mould to the comparison device of the balance for the weighing of the filled moulds. The said comparison device processes the data obtained from the empty mould weighing step by means of a differential element and preferentially generates impulses which allow the adjustment of the batching device of the forming machine.

BRIEF DESCRIPTION OF THE DRAWINGS

The here proposed invention will now be described more in detail and illustrated on hand of a preferred embodiment thereof and the accompanying drawings.

DESCRIPTION OF THE PREFERRED EMBODIMENTS

Figure 1:
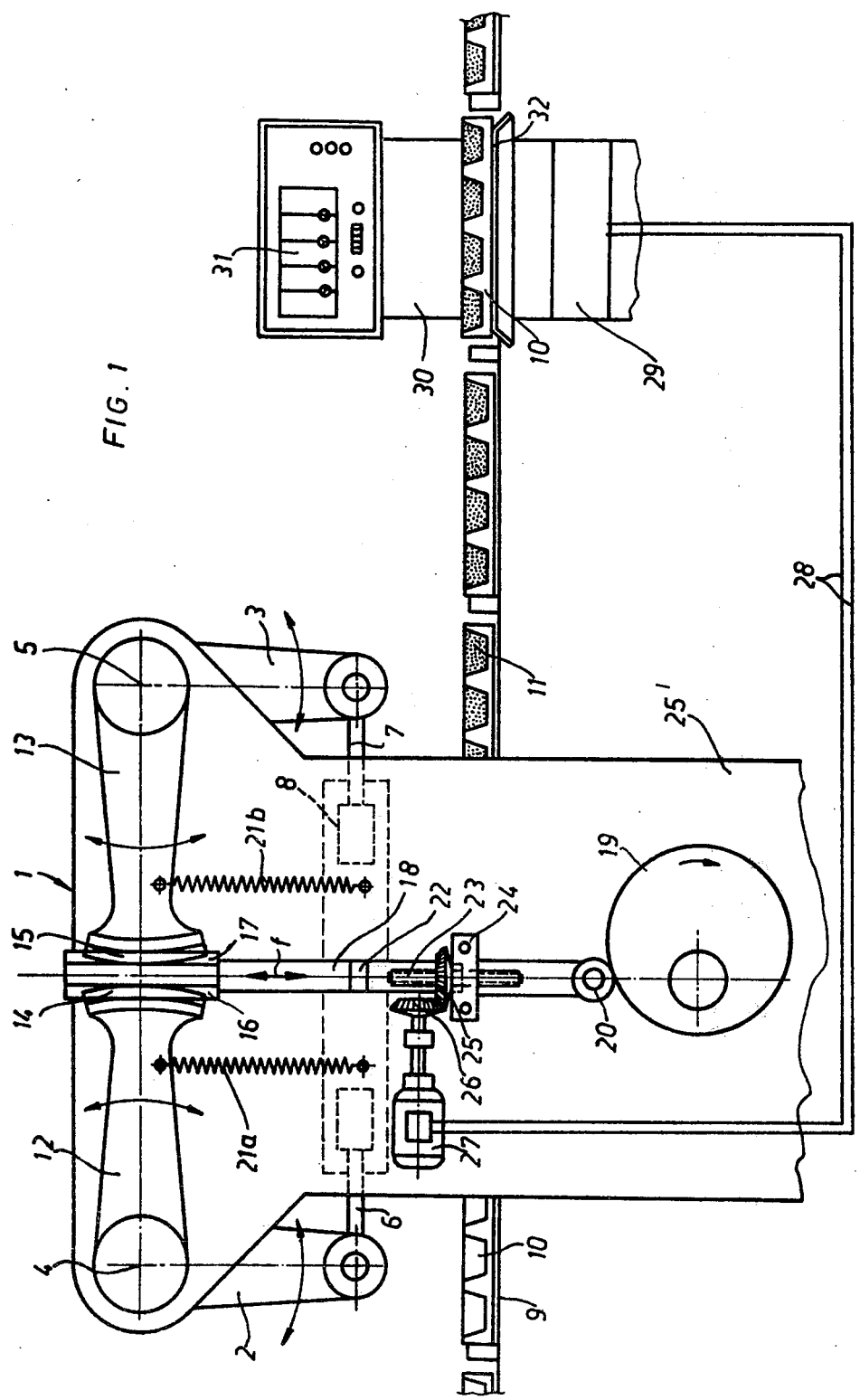
FIG. 1 schematically shows part of the forming machine complete with the control and adjusting means conceived according to this invention.

As shown in FIG. 1, the batching machine has on its upper part two arms 2 and 3 capable to oscillate around the axes 4 and 5. The lower ends of the oscillating arms 2, 3 are connected to a series of pistons 6 and 7, the said connection being articulated. The said pistons 6, 7 are cooperating with a pouring head 8, schematically indicated by dashes. The moulds 10, conveyed by a conveyor belt 9, pass below the head 8. In synchronisation with the feed of the moulds 10, the arms 2, 3 control the up-and-down movement of the pistons 6, 7, injecting in the pits 11 of the stamps 10 the product supplied by the head 8 through ducts (not shown).

To allow the arms 2, 3 and therewith the pistons 6, 7 to follow their oscillating movement, the said arms 2, 3 are connected to levers 12, 13 oscillating around the axes 4, 5. The ends of the levers 12, 13 are made as sector gear meshing with the racks 16, 17 at the end of a rod 18 capable of a reciprocating movement in the direction of the arrow f. The reciprocating movement of the rod 18, the levers 12, 13, the arms 2, 3 and the pistons 6, 7 is thus generated by a cam disk 19, with the rod 18 being in contact with the circumference of the disk 19 by means of a tracer roll 20. The levers 12, 13 are preferentially conrolled by springs 21a, 21b, tending to lower the levers 12, 13. The rod 18 is in addition provided with a stop 22 which, projecting, engages the upper end of a threaded rod 23, screwed to a small bracket 24 fixed to the frame 25' of the forming machine 1.

The threaded rod 23 is engaged with a spiral bevel gear 25, interacting with still another spiral bevel gear 26 driven by a motor 27, preferentially a stepping motor.

The rotation of the spiral bevel gears 25, 26 allows the raising or lowering of the threaded rod 23. The stop 22 interacting with the threaded rod 23, engages therefore, when moving downward, and under the action of the spring 21, the said threaded rod 23 and for this reason according to the position of the end of the said threaded rod 23, the downward movement of the rod 18 will be more or less long and therefore also the suction stroke of the pistons 6, 7 of the forming machine will be more or less long; this obviously allows to regulate without any difficulty the quantity of product to be supplied to the moulds 10.

The stepping motor 27, for example, can be connected by conductors 28 with a comparison and control device 29 of a balance 30. This balance 30 is preferentially an electronic balance which allows to measure by means of a suitable programming panel 31 and the appurtenant circuit the required weight of the full mould 10.

The mould 10 after filling, is passed over a weighing table 32.

Figure 2:
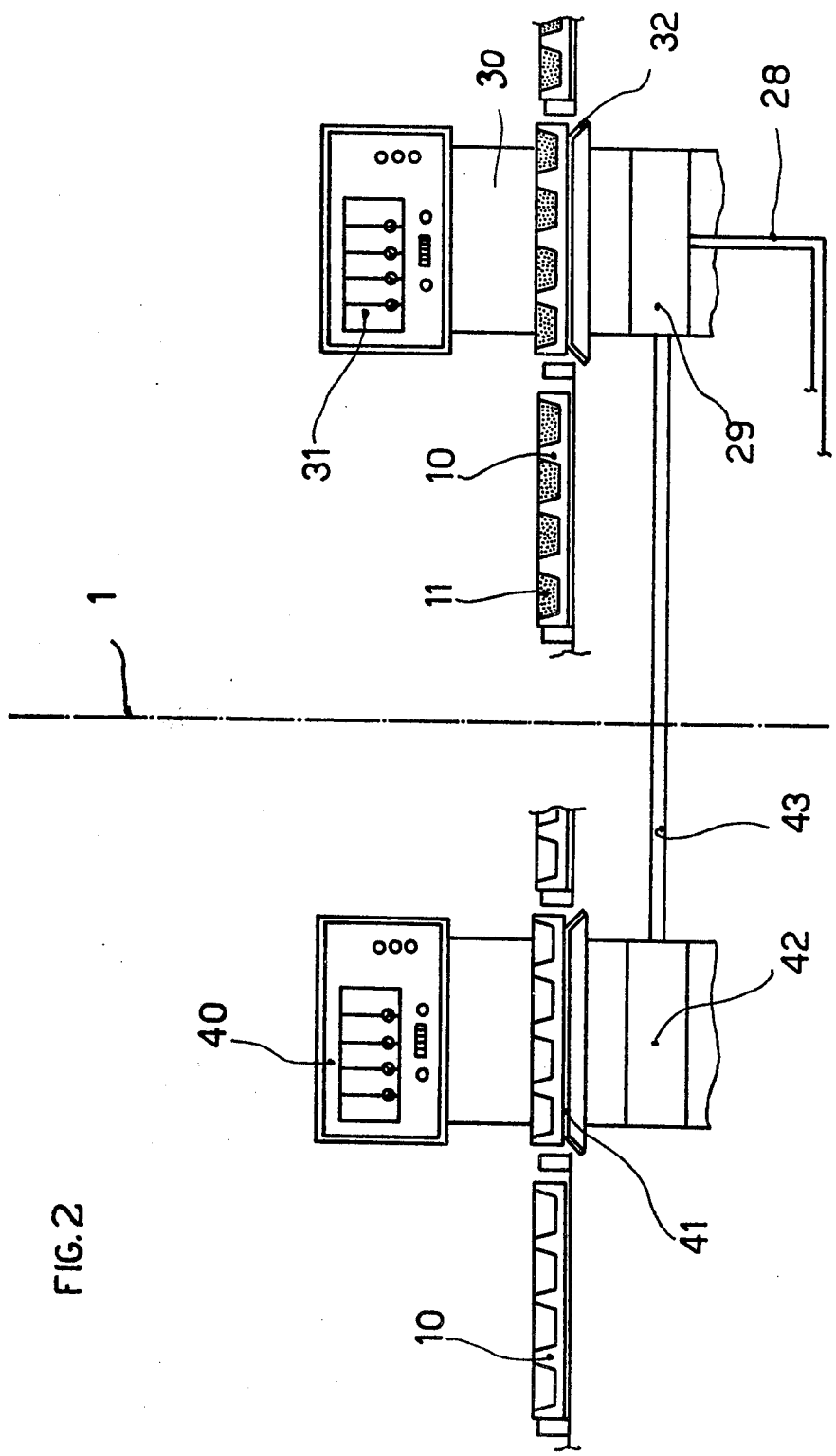
FIG. 2 shows the positioning of the balance for weighing the full moulds and that for weighing the empty moulds.

As shown in FIG 2, behind the batching device 1, only schematically by means of the centre line (being already shown in detail in FIG. 1), a second balance 30 is provided for weighing, always on the weighing table, 32, the moulds 10 whose pits have been filled with the product. The reading and control device 29 of the balance 30 is connected to the stepper motor (not shown) by conductors 28, with the said stepper motor adjusting the operation of the batching elements of the batching device 1, if the weight obtained during the weighing step on the weighing table 32 differs (within preset limits) from a rated weight determined by means of a programming circuit 31.

To allow us now to compensate for and keep account of possible modifications of the empty moulds 10, the here outlined invention is providing a further balance 40 positioned upstream of the forming machine 1.

This balance, too, is provided with a weighing table 41 over which the empty moulds 10 are passing. A means of registration and transmission 41 and the conductors 43 transmit the weight of the empty moulds 10 to the control device 29 of the balance 30, allowing in this manner to adjust the amount of product to be poured into the mould also in function of the weight of the empty moulds 10.

For this purpose the control device 29 is fitted with a known electronic differential designed for substracting the weight of the empty mould from that of the full mould. If the amount of product contained in the mould corresponds to the given values, no modification will take place; if the weight differs therefrom, the stepping motor will regulate the forming machine batching devices accordingly.

The operation of the means according to this invention and in particular shown in FIG. 1 is as follows: The weight of each single mould 10, when filled, is ascertained by means of the weighing table 32 of the balance 30 positioned immediately downstream of the forming machine 1. This weight is compared by means of the comparing and controlling device 29 with the rated weight and registered by the balance, if the weight of the filled moulds surpasses a given limit; the device 29, by means of the conductors 28, transmits in this case a signal to the stepper motor 27 and the strength of the signal or its duration determines the action of the motor 27 so as to reduce, interacting with the bevel gears 25, 26, the stroke of the pistons 6, 7 and in this manner also the amount of product poured into the moulds. If now the weight of the filled moulds 10 drops by a certain quantity below the rated weight, the signals emitted by the device 29 and transmitted by the conductors in the opposite direction, will cause the stepping motor to interact on the pistons 6, 7, increasing their stroke and therewith also the amount of product fed into the moulds 10.

While the present description, given by way of example, relates to a forming machine with a piston-controlled batching device, it is obvious that the same criterion can also be applied to forming machines of different construction, it being sufficient to adapt the adjusting means to the specific pouring system.

Always according to the invention here described and as illustrated in FIG. 2, the empty mould can be weighed on a weighing table 41 and the obtained value be transmitted by means 42, 43 to the comparing and regulating device 29 which, thus, will allow for the weight of the empty mould before comparing the obtained values with the rated ones.

What I claim is:

1. Apparatus for controlling the amount of a product introduced into the moulds of a forming machine for chocolate and the like, said machine comprising a pouring head, a pair of pistons cooperative with said pouring head for causing product to be supplied by said pouring head to moulds for filling thereof upon movement of said pistons, an actuator rod for actuation of said pistons and adapted for reciprocating movement, crank lever arms connected with said pistons and each reciprocable about a crank axis, further crank arms respectively connected to the first said crank arms, said further crank arms each carrying at one end a sector gear, said actuator rod having at one end a rack, each said sector gear meshing with said rack, a stop comprising a threaded rod for engagement by said actuator rod for limiting movement of said actuator rod in one direction thereby to limit the stroke of said piston, said forming machine comprising a cam, said actuator rod carrying at the opposite end a cam tracer, spring means urging said actuator rod toward said cam, rotation of said cam causing reciprocating movement of said actuator rod away from and toward said cam, said threaded rod limiting movement of said actuator rod toward said cam, a stepper motor, said threaded rod being adapted for being turned by said stepper motor for shifting the axial portion of said threaded rod, means carried by said actuator rod for engaging the end of said threaded rod, for varying the extent which movement of said actuator rod is limited by said threaded rod, empty moulds being supplied by conveyor upstream of said forming machine, and filled moulds to be carried by conveyor downstream of said forming machine, an electronic balance including a weighing table for weighing each mould after filling thereof, said electronic balance for weighing the filled moulds being downstream of said forming machine, a further electronic balance upstream of said forming machine for weighing empty moulds supplied thereto, and control means, responsive to said weighing table and connected to said stepper motor, for operating said stepper motor if the weight of a filled mould differs from a rated weight thereby automatically to increase or decrease the weight of filled moulds to said rated weight, said control means being responsive also to said further balance for controlling said stepper motor also as a function of the weight of said empty moulds, said electronic balances each having a programming means for predetermining a rated mould weight, and means for comparing an actual mould weight with said rated weight, the first said electronic balance being connected with said further electronic balance for transmitting the weight of the empty moulds to said further electronic balance, the first said balance including an electronic differential for subtracting the weight of an empty mould from that of a filled mould to determine the weighted amount of product in a filled mould, said control means of the first said balance allowing for the weight of an empty mould before comparing the weight of a filled mould with said rated weight.

2. Apparatus as set forth in claim 1 and further characterized by movement of said actuator rod toward said cam defining a suction stroke of each said piston, whereby said threaded rod limits the motion stroke of each of said pistons.

* * * * *